(12) United States Patent
Miller

(10) Patent No.: US 6,460,655 B2
(45) Date of Patent: Oct. 8, 2002

(54) VEHICLE HYDRAULIC SYSTEM

(75) Inventor: James Anton Miller, Cedar Falls, IA (US)

(73) Assignee: Deere & Company, Moline, IL (US)

(*) Notice: Subject to any disclaimer, the term of this patent is extended or adjusted under 35 U.S.C. 154(b) by 21 days.

(21) Appl. No.: 09/765,257

(22) Filed: Jan. 18, 2001

(65) Prior Publication Data

US 2002/0100639 A1 Aug. 1, 2002

(51) Int. Cl.[7] ................................................ F01M 9/00
(52) U.S. Cl. ...................... 184/6.1; 184/6.22; 184/6.28; 60/430; 60/444; 60/484; 180/53.1; 180/417
(58) Field of Search ............................... 184/6.1, 6.22, 184/6.28, 104.1, 104.2, 104.3, 6.24; 60/396, 430, 444, 453, 456, 468, 484; 180/53.1, 53.4, 305, 306, 417, 441

(56) References Cited

U.S. PATENT DOCUMENTS

| | | | | |
|---|---|---|---|---|
| 3,584,698 A | * | 6/1971 | Larson et al. | 180/14.3 |
| 3,827,522 A | * | 8/1974 | Krause | 180/306 |
| 5,826,676 A | * | 10/1998 | Ko | 180/403 |
| 5,875,630 A | * | 3/1999 | Walsh et al. | 60/421 |

OTHER PUBLICATIONS

John Deere, "Technical Manual 5210, 5310, 5410, and 5510 Tractors"; pp. 270–20–6 and 270–2–7, 1998.

* cited by examiner

*Primary Examiner*—Chong H. Kim

(57) ABSTRACT

A hydraulic system is provided for a vehicle having front, middle and rear portions. The hydraulic system includes a main pump located in the front portion, and a secondary pump located in the front portion which supplies fluid to an inlet of the main pump and to lube circuits. High pressure hydraulic functions are located in the middle and rear portions and receive high pressure fluid from the main pump. A hydraulic filter is located in the front portion and is connected to an outlet of the secondary pump for filtering fluid communicated to the inlet of the main pump. A relief valve is located in the front vehicle portion and is connected between the outlet of the secondary pump and the hydraulic filter. An inlet suction screen is located in the rear portion and is connected between a sump and the inlet of the main pump. An oil cooler is located in the front vehicle portion and is connected between the hydraulic filter and an inlet of the main pump.

4 Claims, 1 Drawing Sheet

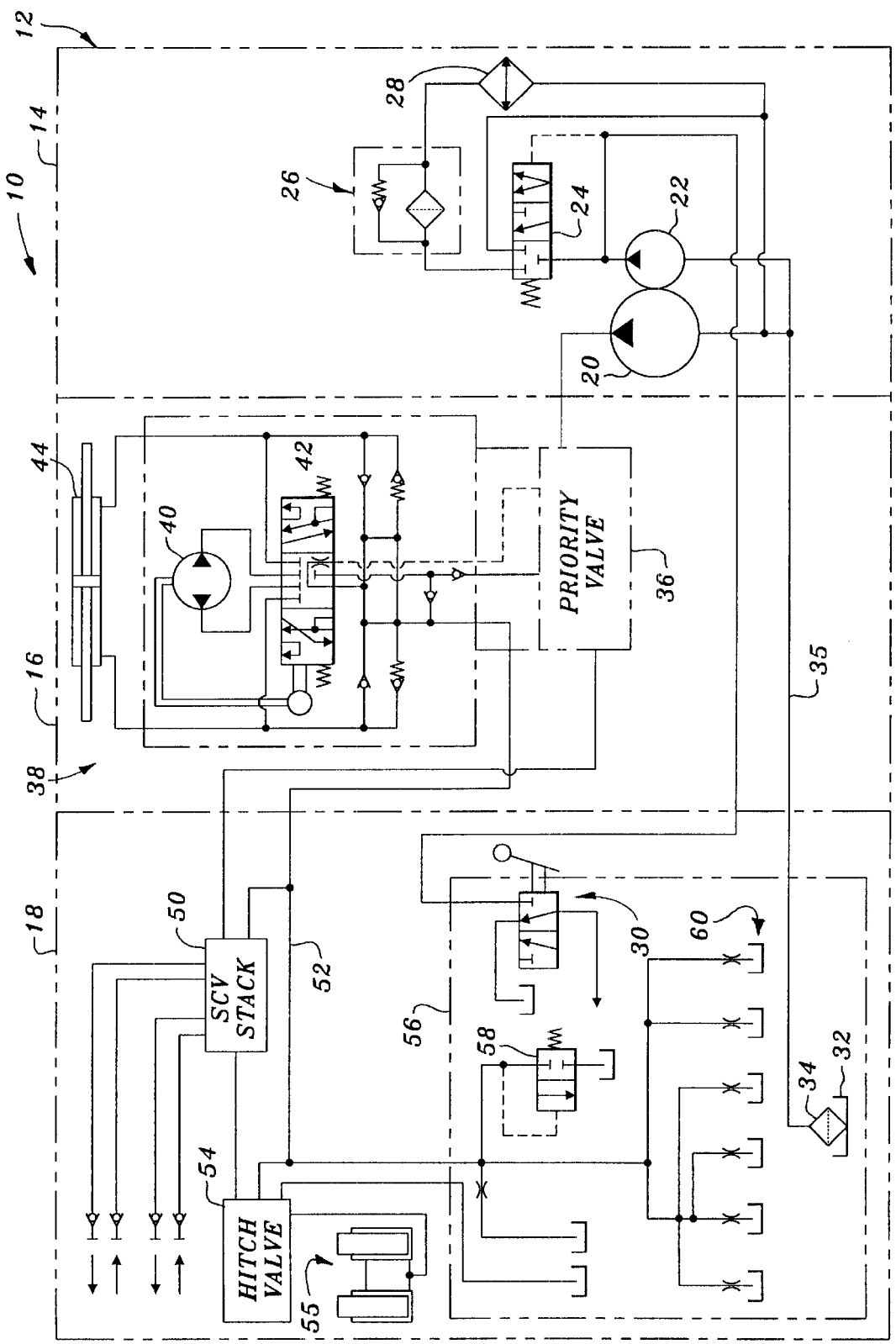

VEHICLE HYDRAULIC SYSTEM

BACKGROUND OF THE INVENTION

The invention relates to a hydraulic system for a vehicle, such as an agricultural tractor.

Current production agricultural tractors have hydraulic systems which typically have an engine driven pump near the engine at the front of the tractor, a hydraulic oil cooler at the front of the tractor, hydraulic components, such as steering and brake system components at the middle and rear of the tractor, hydraulic components, such as hitch system components and selective control valves at the rear of the tractor, and a filter in the pump inlet line. Typically, the steering system hydraulic components are connected in series between the pump and the oil cooler. Such a system requires multiple hydraulic lines to connect the hydraulic oil cooler at the front of the tractor to the components at the middle and rear of the tractor. These lines take up space in the operators compartment and in other parts of the tractor. Also, when starting the tractor in cold weather, with the filter in the pump inlet line, the hydraulic pump can cavitate, and this can cause noise, temporary loss of performance and can damage the pump.

SUMMARY OF THE INVENTION

Accordingly, an object of this invention is to provide a tractor hydraulic system with fewer hydraulic lines between the hydraulic oil cooler at the front of the tractor and the components at the middle and rear of the tractor.

A further object of the invention is to provide such a tractor hydraulic system which substantially or greatly reduces the tendency of the system to cavitate.

These and other objects are achieved by the present invention, wherein a hydraulic system is provided for a vehicle having front, middle and rear portions. The hydraulic system includes a main pump located in the front portion, and a secondary pump located in the front portion which supplys fluid to an inlet of the main pump and to lube circuits. High pressure hydraulic functions are located in the middle and rear portions and receive high pressure fluid from the main pump. A hydraulic filter is located in the front portion and is connected to an outlet of the secondary pump for filtering fluid communicated to the inlet of the main pump. A relief valve is located in the front vehicle portion and is connected between the outlet of the secondary pump and the hydraulic filter. An inlet suction screen is located in the rear portion and is connected between a sump and the inlet of the main pump. An oil cooler is located in the front vehicle portion and is connected between the hydraulic filter and an inlet of the main pump.

BRIEF DESCRIPTION OF THE DRAWINGS

FIG. 1 is a schematic diagram of a vehicle hydraulic system according to the present invention.

DETAILED DESCRIPTION

FIG. 1 shows hydraulic system 10 for a vehicle 12 which includes a front portion 14, a middle portion 16 and a rear portion 18. The hydraulic system 10 includes a plurality of components distributed among these portions 14–18.

The front portion 14 includes a main pump 20 and a cooler pump 22. The output of pump 22 is connected to the inlet of pump 20 via a relief valve 24 and to a series connected filter 26 and oil cooler 28. An outlet of relief valve 24 is also connected directly to the input of pump 20. The outlet of pump 22 may also be connected directly to an optional hi-lo clutch control valve 30. The inlets of pumps 20 and 22 (and the outlets of cooler 28) are connected to a sump 32 and inlet suction screen 34, both located in the rear vehicle portion 18. Only a single hydraulic line 35 extends back to the rear vehicle portion 18 to the suction screen 34.

The middle vehicle portion 16 includes a conventional priority valve 36 which is connected to the outlet of the main pump 20 and to a conventional hydraulic steering system 38. Steering system 38 preferably includes a steering pump 40, a steering control valve 42 and a steering cylinder 44. Priority valve 36 is also connected to a selective control valve ("SCV") stack 50 which is preferably located in the rear portion vehicle 18. Hydraulic steering system 38 is also connected via line 52 to SCV stack 50, a hitch control valve 54 and lube circuits 56, both also preferably located in the rear portion vehicle 18. The conventional hitch control valve 54 controls conventional hitch cylinders 55.

The rear vehicle portion 18 includes the hi-lo clutch control valve 30, the SCV stack 50, hitch valve 54 and the lube circuit 56. Lube circuit 56 includes a lube relief valve 58, a plurality of differential and PTO lube orifices 60, inlet filter 34 and sump 32.

With this system 10 the filter 26 is connected near to the outlet of pump 22 and main pump 20 provides high pressure, high flow hydraulic oil for the hydraulic functions which require high pressure hydraulic fluid. There is only a single hydraulic line 35 between the hydraulic oil cooler 28 at the front of the vehicle and the suction screen 34 at the rear of the vehicle.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A hydraulic system in a vehicle having front, middle and rear portions, comprising:
    a main pump located in the front portion;
    a secondary pump located in the front portion and supplying fluid to an inlet of the main pump;
    high pressure hydraulic functions located in the middle and rear portions and receiving higher pressure fluid from the main pump; than the fluid pressure received by the main pump from the secondary pump;
    a hydraulic filter connected to an outlet of the secondary pump and filtering fluid communicated to the inlet of the main pump, wherein an intake filter is located in the rear portion and is connected between a sump and the inlet of the main pump.

2. The hydraulic system of claim 1, wherein:
    a relief valve is located in the front vehicle portion and is connected between the outlet of the secondary pump and the hydraulic filter.

3. The hydraulic system of claim 1, wherein:
    an oil cooler is located in the front vehicle portion and is connected between the hydraulic filter and an inlet of the main pump.

4. The hydraulic system of claim 1, wherein:
    the secondary pump supplies fluid to lube circuits in the rear vehicle portion.

* * * * *